US012804260B2

(12) United States Patent
Lee et al.

(10) Patent No.: US 12,804,260 B2
(45) Date of Patent: Nov. 17, 2026

(54) ELECTRONIC DEVICE FOR RECORDING IMAGE AS PER MULTIPLE FRAME RATES USING CAMERA AND METHOD FOR OPERATING SAME

(71) Applicant: Samsung Electronics Co., Ltd., Gyeonggi-do (KR)

(72) Inventors: Wooyong Lee, Gyeonggi-do (KR); Kyungyul Seo, Gyeonggi-do (KR); Jonghun Won, Gyeonggi-do (KR); Changhoon Kang, Gyeonggi-do (KR); Donghyun Kim, Gyeonggi-do (KR); Sungeun Kim, Gyeonggi-do (KR); Daehyun Sung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 47 days.

(21) Appl. No.: 18/733,036

(22) Filed: Jun. 4, 2024

(65) Prior Publication Data

US 2024/0323525 A1 Sep. 26, 2024

Related U.S. Application Data

(63) Continuation of application No. 18/126,522, filed on Mar. 27, 2023, now Pat. No. 12,010,423, which is a (Continued)

(30) Foreign Application Priority Data

Feb. 23, 2018 (KR) ........................ 10-2018-0022027

(51) Int. Cl.
*H04N 23/67* (2023.01)
*H04N 7/01* (2006.01)

(52) U.S. Cl.
CPC ........... *H04N 23/67* (2023.01); *H04N 7/0127* (2013.01); *G06T 2207/10148* (2013.01)

(58) Field of Classification Search
CPC .... H04N 23/67; H04N 7/0127; H04N 23/632; H04N 23/675; H04N 5/77; H04N 23/611;
(Continued)

(56) References Cited

U.S. PATENT DOCUMENTS 5,005,039 A * 4/1991 Hamada ................. G02B 7/346
396/95
8,878,974 B2 11/2014 Kamimura
(Continued)

FOREIGN PATENT DOCUMENTS

EP 1 429 334 6/2004
EP 2 169 946 3/2010
(Continued)

OTHER PUBLICATIONS

European Search Report dated Jan. 25, 2021 issued in counterpart application No. 19757514.5-1208, 8 pages.
(Continued)

*Primary Examiner* — Mekonnen D Dagnew
(74) *Attorney, Agent, or Firm* — The Farrell Law Firm, P.C.

(57) ABSTRACT

An electronic device and method thereof are provided. A method for operating an electronic device configured to record an image includes obtaining a plurality of first images for one or more objects as per a first frame rate using a camera; identifying a designated event for slow motion recording while providing a preview using at least one image among the plurality of first images via a display; based at least in part on the designated event, obtaining a plurality of second images as per a second frame rate higher than the first frame rate using the camera while focusing of the camera is locked; and providing a video related to the one or more objects using at least one of the plurality of second images.

20 Claims, 11 Drawing Sheets

Related U.S. Application Data continuation of application No. 17/705,897, filed on Mar. 28, 2022, now Pat. No. 11,616,900, which is a continuation of application No. 16/896,651, filed on Jun. 9, 2020, now Pat. No. 11,290,633, which is a continuation of application No. 16/284,348, filed on Feb. 25, 2019, now Pat. No. 10,715,716.

(58) Field of Classification Search
CPC .......... H04N 23/73; G06T 2207/10148; G03B 39/00
See application file for complete search history.

(56) References Cited

U.S. PATENT DOCUMENTS

| | | | |
|---|---|---|---|
| 8,882,134 B2 | 11/2014 | Rolicki et al. | |
| 9,716,825 B1 | 7/2017 | Manzari | |
| 10,567,641 B1 | 2/2020 | Rueckner | |
| 2003/0089908 A1 | 5/2003 | Mutoh | |
| 2003/0227545 A1 | 12/2003 | Soya | |
| 2008/0297588 A1 | 12/2008 | Kurtz | |
| 2010/0020222 A1 | 1/2010 | Jones et al. | |
| 2010/0062803 A1 | 3/2010 | Yun et al. | |
| 2010/0315521 A1 | 12/2010 | Kunishige et al. | |
| 2012/0242851 A1 | 9/2012 | Fintel et al. | |
| 2015/0042827 A1 | 2/2015 | Noguchi | |
| 2015/0229889 A1 | 8/2015 | Boettiger | |
| 2015/0350544 A1* | 12/2015 | Williams | H04N 5/265 348/239 |
| 2016/0065832 A1 | 3/2016 | Kim et al. | |
| 2016/0104508 A1 | 4/2016 | Chee et al. | |
| 2017/0034432 A1 | 2/2017 | Lou et al. | |
| 2017/0070656 A1 | 3/2017 | Park | |
| 2017/0180589 A1* | 6/2017 | Guo | H04N 1/2133 |
| 2017/0195539 A1* | 7/2017 | Tung | H04N 5/765 |
| 2017/0230629 A1 | 8/2017 | Kosakai et al. | |
| 2018/0232894 A1 | 8/2018 | Kim | |
| 2019/0068915 A1 | 2/2019 | Okada | |
| 2019/0130189 A1 | 5/2019 | Zhou | |

FOREIGN PATENT DOCUMENTS

| | | |
|---|---|---|
| EP | 2 680 615 | 1/2014 |
| KR | 1020100028862 | 3/2010 |
| KR | 1020170066415 | 6/2017 |
| WO | WO 2016/056871 | 4/2016 |

OTHER PUBLICATIONS

International Search Report dated May 28, 2019 Issued in counterpart application No. PCT/KR2019/002081, 9 pages.
Korean Office Action dated Apr. 12, 2023 issued in counterpart application No. 10-2018-0022027, 10 pages.
European Search Report dated Dec. 1, 2025 issued in counterpart application No. 25198081.9-1207, 8 pages.
EP Communication Report dated Jul. 7, 2026 issued in counterpart application No. 25198081.9-1207, 6 pages.

* cited by examiner

ELECTRONIC DEVICE FOR RECORDING IMAGE AS PER MULTIPLE FRAME RATES USING CAMERA AND METHOD FOR OPERATING SAME

CROSS-REFERENCE TO RELATED APPLICATION(S)

This application is a Continuation of U.S. Ser. No. 18/126,522, which was filed in the U.S. Patent and Trademark Office (USPTO) on Mar. 27, 2023, which is a Continuation of U.S. Ser. No. 17/705,897, which was filed in the USPTO on Mar. 28, 2022, issued as U.S. Pat. No. 11,616,900 on Mar. 28, 2023, which is a Continuation of U.S. Ser. No. 16/896,651, which was filed in the USPTO on Jun. 9, 2020, issued as U.S. Pat. No. 11,290,633 on Mar. 29, 2022, which is a Continuation of U.S. application Ser. No. 16/284,348, which was filed in the USPTO on Feb. 25, 2019, issued as U.S. Pat. No. 10,715,716 on Jul. 14, 2020, and claims priority under 35 U.S.C. § 119 to Korean Patent Application Serial No. 10-2018-0022027, which was filed in the Korean Intellectual Property Office on Feb. 23, 2018, the entire disclosure of each of which is incorporated herein by reference.

BACKGROUND

1. Field

The disclosure relates generally to electronic devices for recording videos in super slow motion and methods for operating the same.

2. Description of Related Art

Recently, electronic devices have been providing more diversified services and additional functions. Various applications executable on electronic devices are being developed to meet the diverse demands of users and to raise the utility of electronic devices.

Among these are camera applications, whereby the user may take a selfie or foreground picture using the camera of their electronic device. The electronic device may include a camera module for capturing images. The camera module may typically include a lens for collecting light, a photodiode for converting the collected light into an electrical signal, and an analog-to-digital converter (ADC) for converting the electrical signal. The process of a camera module converting electrical signals from multiple photodiodes into digital electrical signals and outputting the digital electrical signals may be called "read-out." A camera module of an electronic device may provide an autofocus or manual focus function.

When focusing is performed while capturing video in super slow motion, a read-out by the image sensor may be done before the calculation for focusing is finished, and the resulting super slow motion video may end up with images not properly focused.

SUMMARY

The disclosure has been made to address at least the disadvantages described above and to provide at least the advantages described below.

According to an embodiment of the disclosure, an electronic device is provided. The electronic device includes a camera; a display; a processor; and memory storing instructions that, when executed by the processor, cause the electronic device to obtain a plurality of first images for one or more objects as per a first frame rate using the camera, identify a designated event for slow motion recording while providing a preview using at least one image among the plurality of first images via the display, based at least in part on the designated event, obtain a plurality of second images as per a second frame rate higher than the first frame rate using the camera while focusing of the camera is locked, and provide a video related to the one or more objects using at least one of the plurality of second images.

According to another embodiment of the disclosure, a method is provided for operating an electronic device configured to record an image. The method includes obtaining a plurality of first images for one or more objects as per a first frame rate using a camera; identifying a designated event for slow motion recording while providing a preview using at least one image among the plurality of first images via a display; based at least in part on the designated event, obtaining a plurality of second images as per a second frame rate higher than the first frame rate using the camera while focusing of the camera is locked; and providing a video related to the one or more objects using at least one of the plurality of second images.

According to another embodiment of the disclosure, a non-transitory computer readable storage medium is provided for storing instructions configured to, when executed by a processor of an electronic device, cause the electronic device to obtain a plurality of first images for one or more objects as per a first frame rate using a camera, identify a designated event for slow motion recording while providing a preview using at least one image among the plurality of first images via a display, based at least in part on the designated event, obtain a plurality of second images as per a second frame rate higher than the first frame rate using the camera while focusing of the camera is locked, and provide a video related to the one or more objects using at least one of the plurality of second images.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
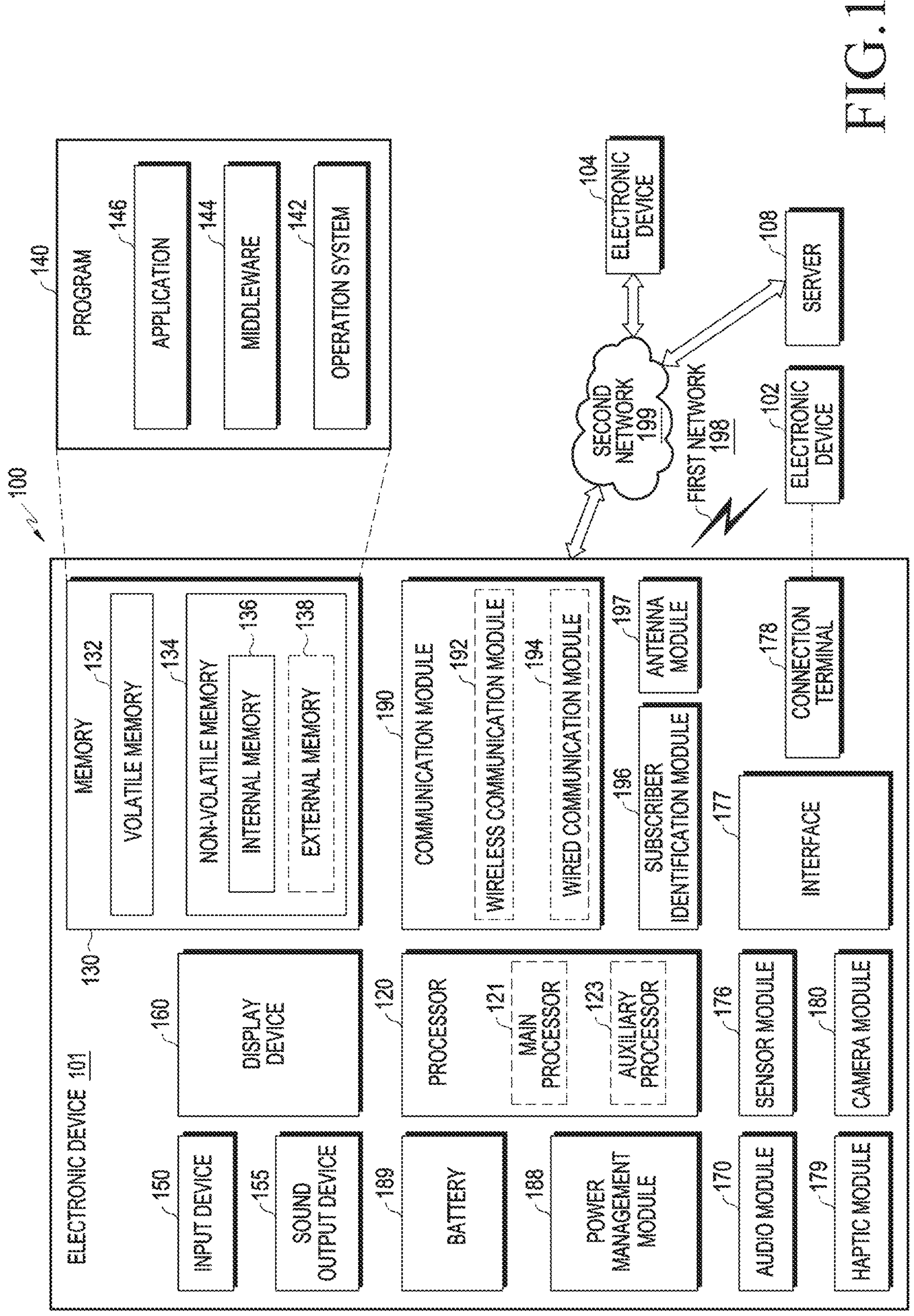
FIG. 1 is a diagram illustrating an electronic device in a network environment, according to an embodiment of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
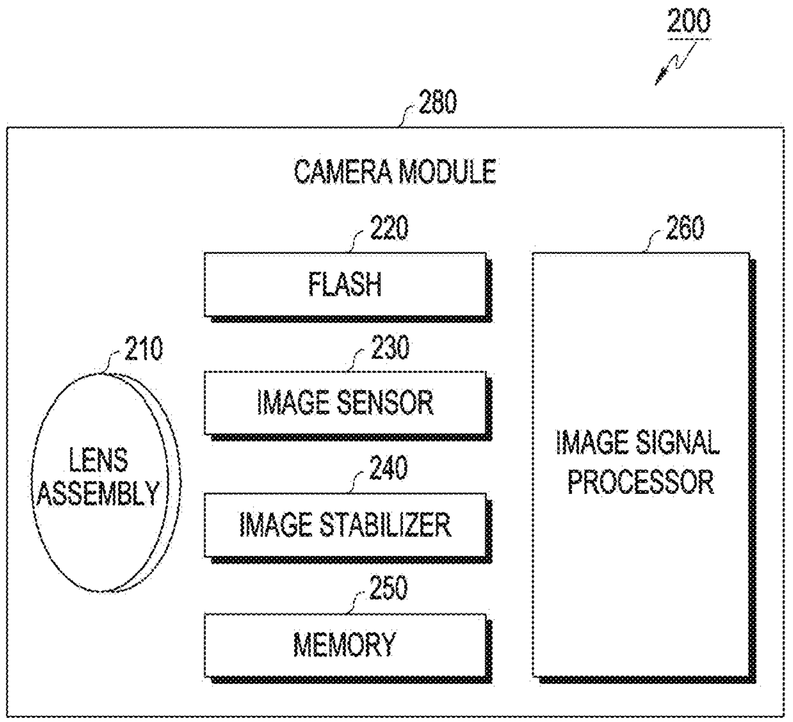
FIG. 2 is a diagram illustrating a camera module, according to an embodiment of the disclosure.

FIG. 2 is a block diagram 200 illustrating the camera module 280 (e.g., the camera module 180 of FIG. 1) according to various embodiments.

Referring to FIG. 2, the camera module 280 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 280 may include a plurality of lens assemblies 210. In such a case, the camera module 280 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 280 or the electronic device 101 including the camera module 180. This allows compensating for at least part of a negative effect (e.g., image blurring) by the movement on an image being captured. According to an embodiment, the image stabilizer 240 may sense such a movement by the camera module 280 or the electronic device 101 using a gyro sensor (not shown) or an acceleration sensor (not shown) disposed inside or outside the camera module 280. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 280. An image processed by the image signal processor 260 may be stored back in the memory 250 for further processing, or may be transferred to an external component (e.g., the memory 130, the display device 160, the electronic device 102, the electronic device 104, or the server 108) outside the camera module 280. According to an embodiment, the image signal processor 260 may distributively process at least some of operations performed by the processor 120. According to an embodiment, the image signal processor 260 may be configured as at least part of the processor 120, or as a separate processor that is operated independently from the processor 120. If the image signal processor 160 is configured as a separate processor from the processor 120, at least one image processed by the image signal processor 160 may be displayed, by the processor 120, via the display device 160 as it is or after being further processed.

According to an embodiment, the electronic device 101 may include a plurality of camera modules 280 having different attributes or functions. In such a case, at least one of the plurality of camera modules 280 may form, for example, a wide-angle camera and at least another of the plurality of camera modules 180 may form a telephoto camera. Similarly, at least one of the plurality of camera modules 280 may form, for example, a front camera and at least another of the plurality of camera modules 180 may form a rear camera.

Figure 3:
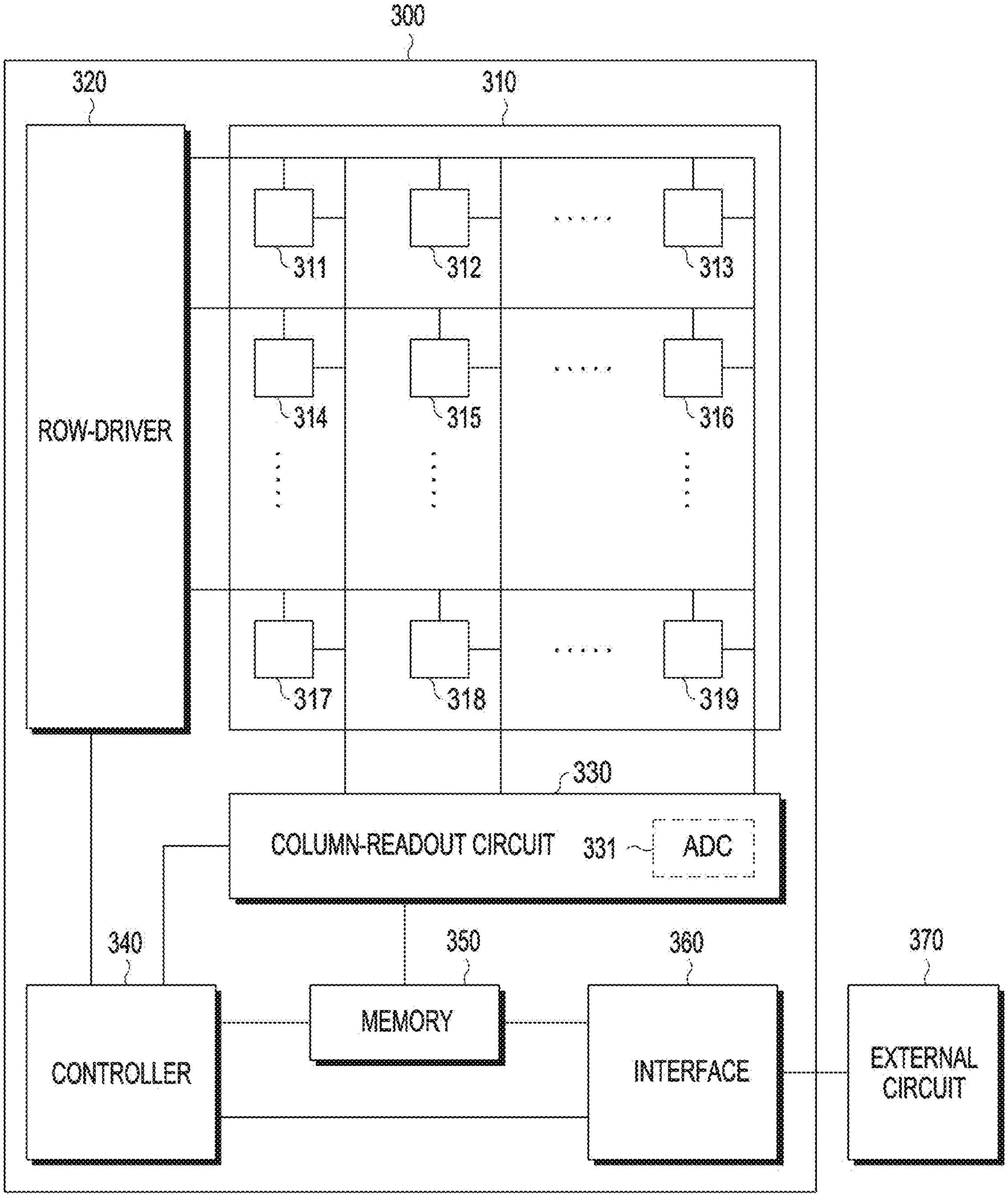
FIG. 3 is a diagram illustrating a structure of an image sensor, according to an embodiment of the disclosure.

FIG. 3 is a diagram illustrating a structure of an image sensor, according to an embodiment of the disclosure.

An image sensor 300 may be a component of a camera module in an electronic device.

Referring to FIG. 3, the image sensor 300 may include at least one of a pixel array 310, a row-driver 320, a column-readout circuit 330, a controller 340, a memory 350, or an interface 360.

The pixel array 310 may include a plurality of pixels 311 to 319. The pixel array 310 may have a structure in which the plurality of pixels 311 to 319 are arrayed in an M×N matrix pattern (where M and N are positive integers). The pixel array 310 where the plurality of pixels 311 to 319 are arrayed in a two-dimensional (2D) M×N pattern may have M rows and N columns. The pixel array 310 may include a plurality of photosensitive elements (e.g., photodiodes or pinned photodiodes). The pixel array 310 may detect light using the plurality of photosensitive elements and convert the light into an analog electrical signal to generate an image signal.

The row-driver 320 may drive the pixel array 310 for each row. The row-driver 320 may output transmission control signals to the transmission transistors of the plurality of pixels 311 to 319 in the pixel array 310, reset control signals to control reset transistors, or select control signals to control selection transistors to the pixel array 310. The row-driver 320 may determine a row to be read out.

The column-readout circuit 330 may receive analog electrical signals generated by the pixel array 310. The column-readout circuit 330 may receive an analog electrical signal from a column line selected from among the plurality of columns constituting the pixel array 310. The column-readout circuit 330 may include an ADC 331 that may convert the analog electrical signal received from the selected column line into pixel data (or a digital signal) and output the pixel data. Meanwhile, the column-readout circuit 330 that receives an analog electrical signal from the pixel array 310, converts the received analog electrical signal into pixel data using the ADC 331, and outputs the pixel data may be referred to as read-out. The column-readout circuit 330 and the ADC 331 may determine a column to be read out.

The column-readout circuit 330 of the image sensor 300 that supports of high speed photography may include a plurality of ADCs 331. Each of the plurality of ADCs 331 may be connected in parallel with a respective one of the plurality of photodiodes in the pixel array 310, and analog electrical signals simultaneously received from the plurality of photodiodes may quickly be converted into pixel data based on the parallel structure. The column-readout circuit 330 of the image sensor 300 that supports of high speed photography may perform a read-out at a high frame rate (e.g., 960 frames per second (fps)). Reading out at 960 fps means that receiving an analog electrical signal from the pixel array 310, converting the received analog electrical signal into pixel data using the ADC 331, and outputting the pixel data are performed once every 1/960 seconds. In other words, reading out at 960 fps may mean that 960 image frames are outputted per second.

The controller 340 may obtain an image frame based on the pixel data received from the column-readout circuit 330. The controller 340 may output the image frame through the interface 360 to an external circuit 370 (e.g., an image signal processor (ISP), processor, communication circuit, or external server). The controller 340 may generate transmission control signals to control the transmission transistors of the plurality of pixels 311 to 319, reset control signals to control reset transistors, or select control signals to control selection transistors and provide the generated signals to the row-driver 320. The controller 340 may generate a selection control signal to select at least one column line from among the plurality of column lines constituting the pixel array 310 and provide the generated signal to the column-readout circuit 330. The column-readout circuit 330 may enable some of the plurality of column lines and disable the other column lines based on selection control signals provided from the controller 340. The controller 340 may distributively process at least some of operations performed by the processor 120. The controller 340 may be implemented in a processor 120 including a CPU or AP, as a sort of block or module. When the controller 340 is implemented as a block, the controller 340 may include a subtractor for detecting a difference between images, or a comparator for comparing images. The controller 340 may downsize read-out images and compare the plurality of downsized images to detect differences between the images.

The memory 350 may include a volatile and/or non-volatile memory. The memory 350 is a storage device inside the image sensor 300. The memory 350 may include a buffer memory. The memory 350 may temporarily store digital signals output from the column-readout circuit 330 or the controller 340. The memory 350 may include at least one image frame obtained based on light received by the pixel array 310. The memory 350 may store at least one digital signal received from the external circuit 370 through the interface 360.

The memory 350 may store at least one image frame read out at an Nth frame rate (e.g., 960 fps) or an Mth frame rate (e.g., 120 fps) from the column-readout circuit 330 and deliver at least one image frame stored through the interface 360 to the external circuit 370 (e.g., an IPS, processor, communication circuit, or external server). In other words, the memory 350 may store at least one image frame read out once every 1/960 seconds or every 1/120 seconds from the column-readout circuit 330, and the memory 350 may deliver at least one image frame stored through the interface 360 to the external circuit 370. The speed at which the image frame is transferred to the external circuit 370 is not limited thereto. The electronic device 101 may transfer immediately, without storing, the read-out image frame through the interface 360 to the external circuit 370.

Meanwhile, the controller 340 may store only some of N image frames read out through the column-readout circuit 330 at the Nth frame rate (e.g., 960 fps) in the memory 350, allowing for substantially the same effect as if M image frames were obtained which are read out at the Mth frame rate (e.g., 120 fps). For example, the controller 340 may store only one of eight image frames read out at 960 fps for 8/960 seconds in the memory 350. When from among a plurality of image frames read out at 960 fps, only image frames selected in the ratio of 1:8 are stored in the memory 350, the image frames stored in the memory 350 may be substantially the same image frames as those read out at 120 fps through the column-readout circuit 330. When a video constituted of only image frames obtained at the cycle of 1/120 seconds is defined as '120 fps video,' a video constituted of only image frames selected in the ratio of 1:8 from among the plurality of image frames read out at 960 fps may be defined as a 120 fps video. A video constituted of only image frames read out at 120 fps through the column-readout circuit 330 may also be defined as a 120 fps video.

The interface 360 may include the interface 177 or the communication module 190. The interface 360 may connect components of the image sensor 300 (e.g., the controller 340 or the memory 350) with the external circuit 370 in a wireless or wired scheme. The interface 360 may deliver at least one image frame stored in the memory 350 of the image sensor 300 to the external circuit 370. (e.g., the memory 130 of the electronic device 101). The interface 360 may also deliver control signals from the processor 120 to the controller 340 of the image sensor 300.

The image sensor 300 may communicate with the external circuit 370 through the interface 360 (e.g., in a serial communication scheme). The memory 350 of the image sensor 300 may communicate with the processor 120 in an inter-integrated circuit (PC) scheme.

The image sensor 300 may connect with the external circuit 370 through the interface 360 (e.g., an interface as defined as per the mobile industry processor interface (MIPI) protocol). The memory 350 of the image sensor 300 may communicate with the processor 120 as per the interface defined in the MIPI protocol. The interface 360 (e.g., the interface defined as per the MIPI protocol) may deliver pixel data corresponding to the image frames stored in the memory 350 to the external circuit 370 at the cycle of 1/120 seconds.

Meanwhile, while the image frames stored in the memory 350 are delivered through the interface 360 having an output speed of 240 fps to the external circuit 370 once every 1/120 seconds, at least some of the image frames read out in real-time through the column-readout circuit 330 may be delivered to the external circuit 370 as preview images once every 1/120 seconds. The processor 120 in the external circuit 370 may display, through the display, all or some of the image frames output as preview images from the image sensor 300 at 30 fps or 60 fps.

All or some of the above-described components 310 to 360 may be included in the image sensor 300 as necessary, and each component may be configured in a single unit or multiple units. The frame rates 120 fps, 240 fps, and 960 fps, may be varied depending on the settings of the electronic device or the performance of the interface.

Figure 4:
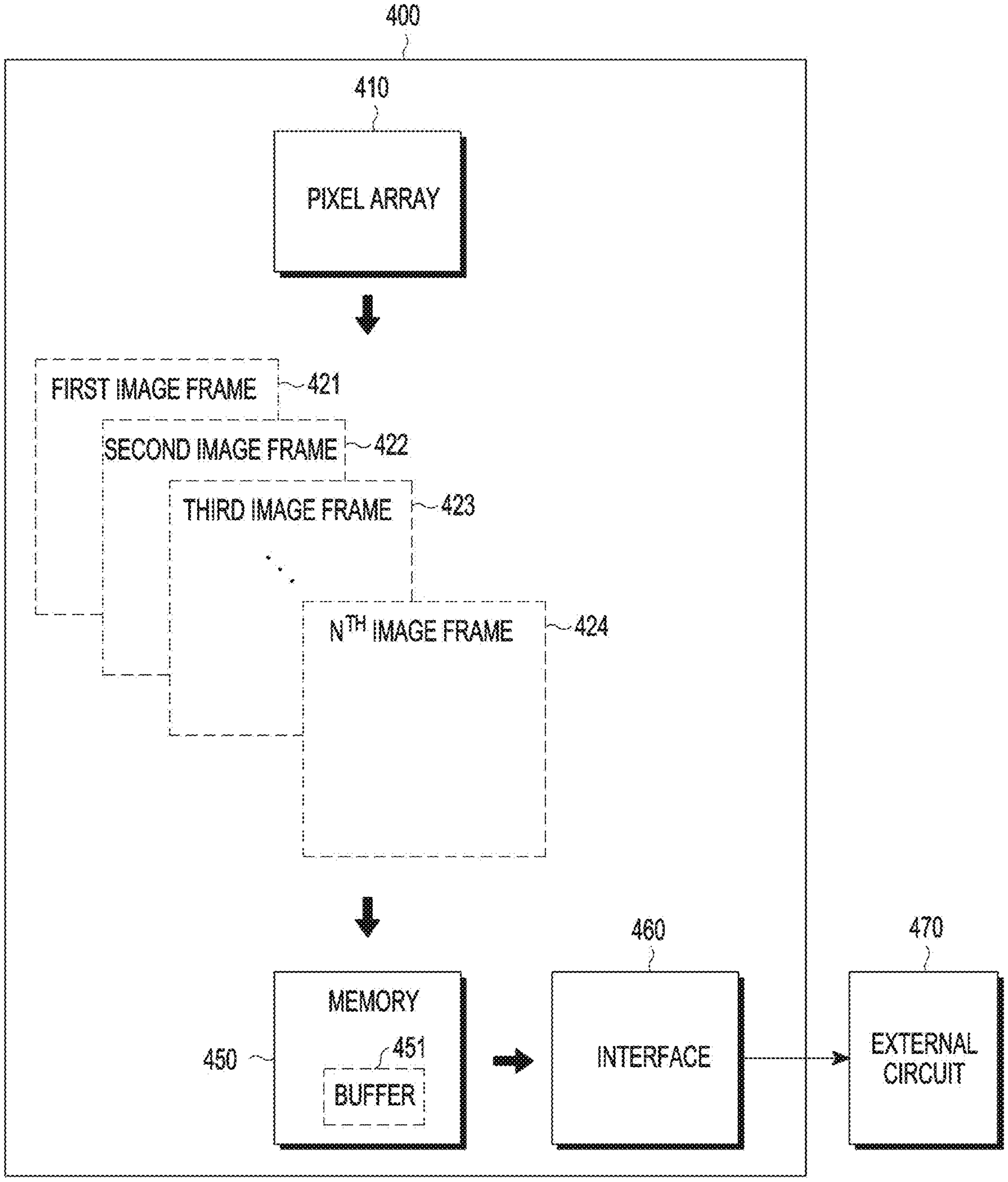
FIG. 4 is a diagram illustrating a process for obtaining an image frame through an image sensor, according to an embodiment of the disclosure.

FIG. 4 is a diagram illustrating a process for obtaining an image frame through an image sensor, according to an embodiment. An image sensor 400 may be a component of a camera module in an electronic device.

Referring to FIG. 4, the image sensor 400 may include at least one a pixel array 410, a memory 450, and an interface

460. The image sensor 400 may include the whole or part of the image sensor 300 of FIG. 3.

The pixel array 410 of the image sensor 400 may output an electrical signal corresponding to light received from the outside. The pixel array 410 may include a plurality of pixels constituted of photodiodes. The photodiodes may receive light and generate analog electrical signals corresponding to the received light. Analog electrical signals generated from the plurality of photodiodes constituting the plurality of pixels may be converted into a plurality of pieces of pixel data through a column-readout circuit. In this case, each piece of pixel data may mean a pixel value corresponding to its respective pixel. A set of a plurality of pieces of pixel data obtained at a particular time may constitute at least one image frame.

The pixel array 410 of the image sensor 400 may output a plurality of image frames 421 to 424 at a preset read-out speed. When the read-out speed is set to 960 fps, the image sensor 400 may read-out 960 image frames per second based on light received by the pixel array 410. The electronic device 101 may detect an event of slow motion recording while recording in a normal mode in which case the electronic device 101 may turn the read-out rate from 120 fps to 950 fps.

The plurality of image frames 421 to 424 read out may be stored in a memory 450 inside the image sensor 400. The memory 450 of the image sensor 400 may include a buffer memory 451. Some of the plurality of image frames 421 to 424 read out at 960 fps may be stored in the buffer memory 451. From among a plurality of image frames continuously read out, a designated number of image frames may be stored in the buffer memory 451. The processor may repeat the operations of deleting the image frame stored earliest from among the image frames stored in the buffer memory 451 and storing the image frame latest from among the image frames.

At least one image frame stored in the memory 450 of the image sensor 400 may be delivered to an external circuit 470 through the interface 460. The processor may control the interface 460 to deliver at least one image frame stored in the memory 450 to the external circuit 470.

The image sensor 400 may exclude the buffer 451. The image frames 421, 422, 423, and 424 from the pixel array 410 may directly be transferred through the interface 460 to the external circuit 470.

Figure 5:
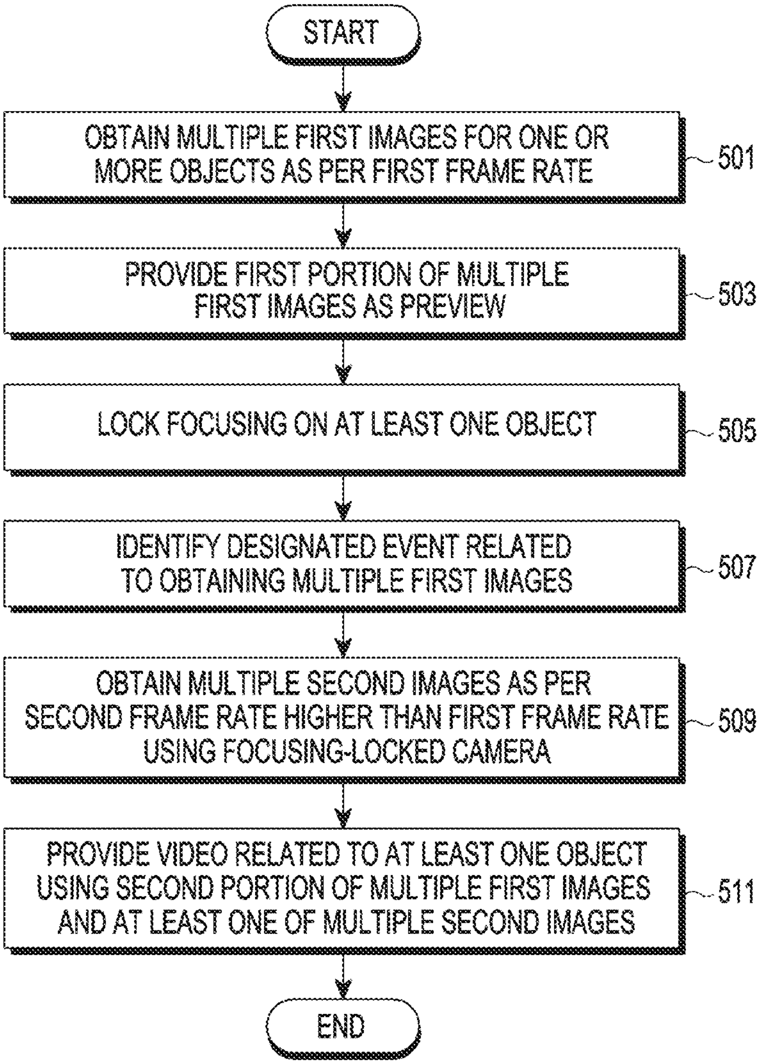
FIG. 5 is a flowchart illustrating a method for recording video in slow motion by way of locking the focusing of a lens of an electronic device, according to an embodiment of the disclosure.
Figure 6A:
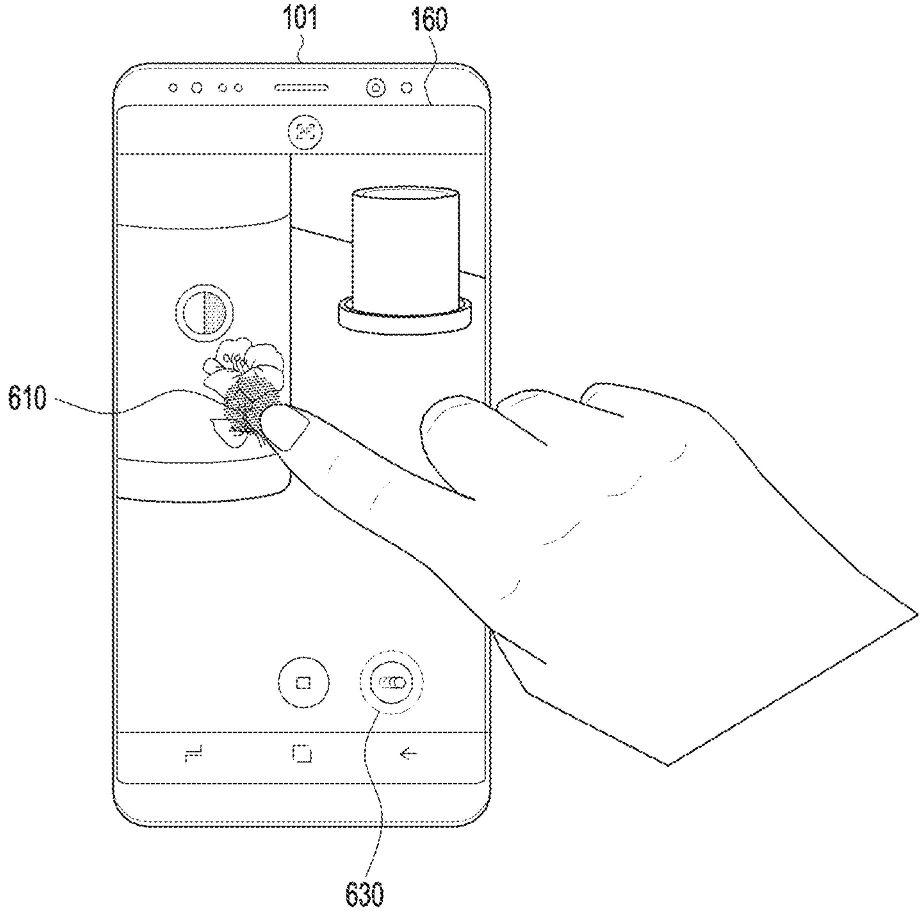
FIG. 6A is a diagram illustrating an operation in which an electronic device performs the focusing of a lens in response to a user's touch input, according to an embodiment of the disclosure.
Figure 6B:
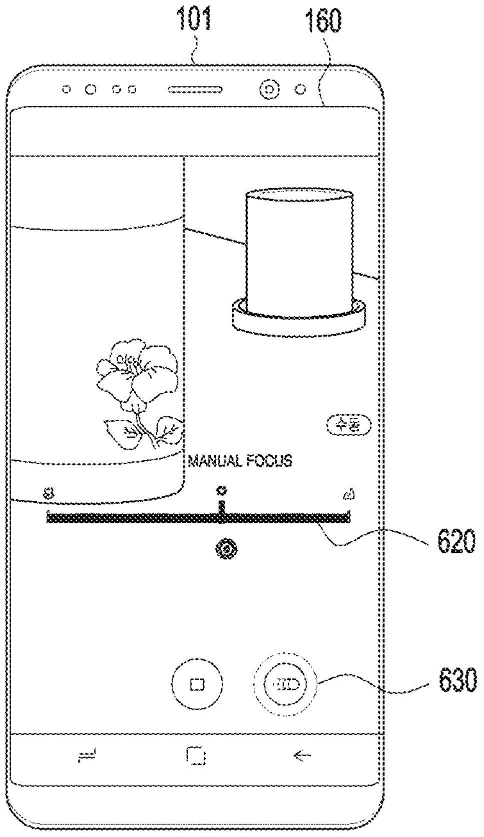
FIG. 6B is a diagram illustrating an operation in which an electronic device performs the focusing of a lens based on a user input to select a degree of focus, according to an embodiment of the disclosure.
Figure 7:
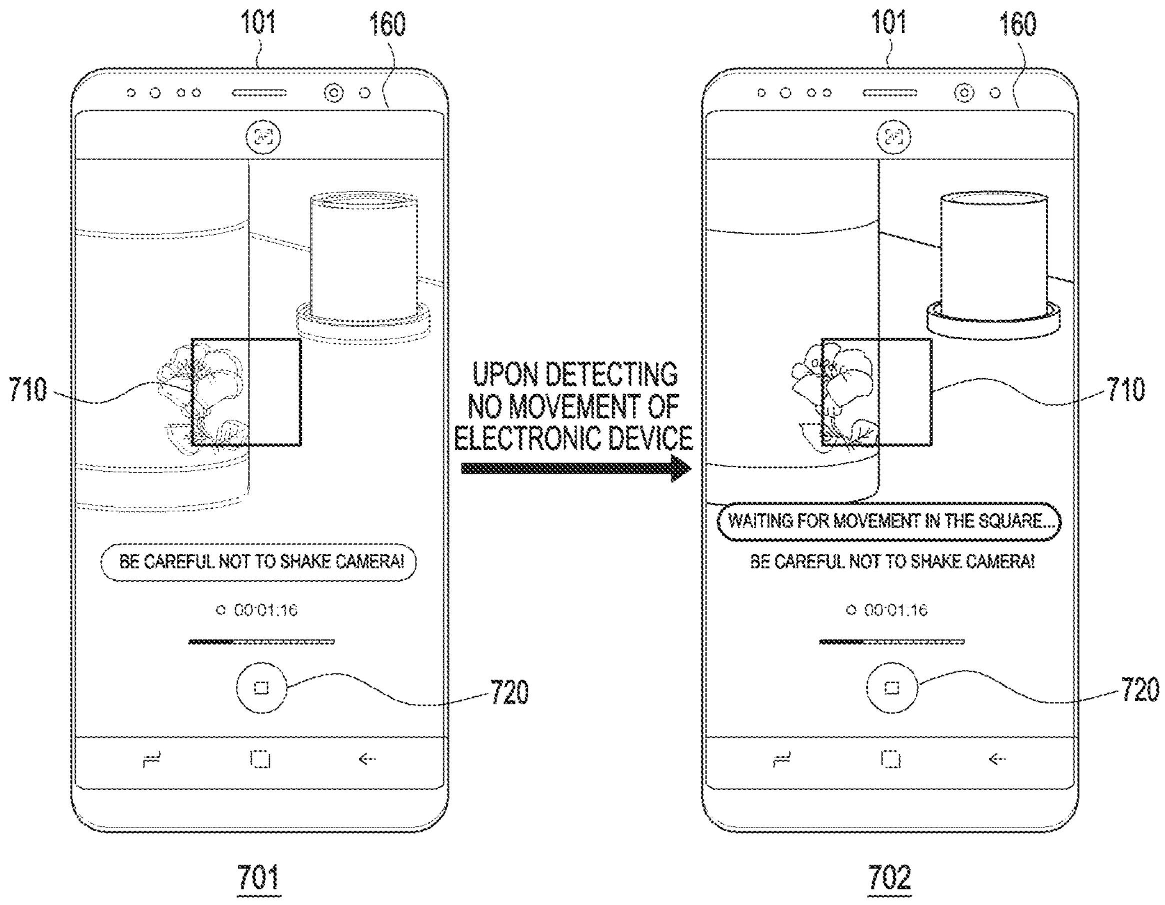
FIG. 7 is a diagram illustrating an example in which an electronic device initiates slow motion recording based on a movement of an object in a designated region, according to an embodiment of the disclosure.

FIG. 5 is a flowchart of a method for locking the focusing of a lens assembly 210 of an electronic device 101 and capturing an image in slow motion, according to an embodiment. FIG. 6A is a diagram illustrating an operation in which an electronic device 101 performs the focusing of a lens assembly 210 in response to a user's touch input, according to an embodiment. FIG. 6B is a diagram illustrating an operation in which an electronic device 101 performs the focusing of a lens assembly 210 based on user input to select the degree of focus, according to an embodiment. FIG. 7 is a diagram illustrating an example in which an electronic device 101 initiates slow motion recording based on a movement of an object in a designated region, according to an embodiment.

At step 501, the electronic device 101 (e.g., at least one of the processor 120 of FIG. 1 or the controller 340 of FIG. 3) may obtain a plurality of first images as per a first frame rate on one or more objects using a camera 180 based on a signal related to image recording. For example, upon receiving an input regarding running a camera application or an input to start recording video from the user, the electronic device 101 may obtain the plurality of first images as per the first frame rate (e.g., 30 fps or 60 fps).

The electronic device 101 (e.g., at least one of the processor 120 or the controller 340) may control the camera to perform a focusing of a lens assembly 210 included in the camera 180 on at least one object from among one or more objects while obtaining the plurality of first images. The electronic device 101 may focus on the at least one object included in a designated region in the plurality of first images. The electronic device 101 may focus on an object included in the region of interest (ROI) included in the plurality of first images. The electronic device 101 may focus on the plurality of first images using continuous autofocus-type contrast auto-focusing. The electronic device 101 may perform the focusing using an optical triangulation system or a phase-difference detection system, but focusing is not limited thereto.

The electronic device 101 (e.g., at least one of the processor 120 or the controller 340) may control the camera to perform the focusing of the lens assembly 210 for the objects corresponding to a region where the user's touch input is obtained. As shown in FIG. 6A, the electronic device 101 may receive the user's touch input through the display 160 and control the camera to perform the focusing of the lens assembly 210 onto the object corresponding to the region 610 where the touch input is received. The electronic device 101 may control the camera to perform the focusing of the lens assembly 210 based on user input to select the degree of focus. As shown in FIG. 6B, the electronic device 101 may display a user interface 620 for selecting the degree of focus on the plurality of first images through the display 160. The electronic device 101 may control the camera to perform the focusing of the lens assembly 210 based on the user input to select the degree of focus through the user interface 620. The above-described focusing methods amount to a mere example, and embodiments of the disclosure are not limited thereto.

The electronic device 101 (e.g., at least one of the processor 120 or the controller 340) may control the camera to perform adjusting exposure of the camera 180 on at least one object from among one or more objects while obtaining the plurality of first images. The electronic device 101 may adjust its exposure by adjusting at least one of the aperture or shutter speed of the camera 180 or sensitivity (e.g., the International Organization of Standardization (ISO)) of the image sensor 230. The electronic device 101 (e.g., at least one of the processor 120 or the controller 340) may control the camera to perform adjusting exposure of the camera 180 on at least one object. The electronic device 101 (e.g., at least one of the processor 120 or the controller 340) may control the camera to perform adjusting exposure of the camera 180 on at least one object while locking the focusing.

At step 503, the electronic device 101 (e.g., the processor 120) may provide a first portion of the plurality of first images as a preview through the display 160. The electronic device 101 may display all or some of the image frames, which have been output in the preview from the image sensor 230, through the display 160 at 30 fps or 60 fps.

At step 505, the electronic device 101 (e.g., at least one of the processor 120 or the controller 340) may control the camera to lock the focusing using the camera 180 to prevent a change of the focusing on at least one object. The electronic device 101 (e.g., at least one of the processor 120 or the controller 340) may control the camera 180 to lock the adjusting the exposure to prevent a change of the exposure on the at least one object. The electronic device 101 (e.g., at least one of the processor 120 or the controller 340) may control the camera 180 to lock the adjusting the exposure to prevent a change of the exposure on the at least one object while locking the focusing.

At step 507, the electronic device 101 (e.g., the processor 120) may identify a designated event in relation to obtaining the plurality of first images. The electronic device 101 (e.g., the processor 120) may identify a user input related to initiating slow motion recording as part of identifying the designated event. As shown in FIG. 6B, the electronic device 101 may display a user interface 630 related to initiating slow motion recording through the display 160 and identify the reception of a user input through the user interface 630. In response to receiving a user interface through the user interface 630 related to initiating slow motion recording, the electronic device 101 may lock the focusing to prevent defocusing on at least one object using the camera. In response to receiving a user interface through the user interface 630 related to initiating slow motion recording, the electronic device 101 may lock the adjustment of exposure to prevent a change in exposure from occurring on at least one object using the camera 180.

The electronic device 101 (e.g., at least one of the processor 120 or the controller 340) may obtain a plurality of third images as per a third frame rate through the image sensor 230 included in the camera 180 based on a movement of the electronic device 101, as part of identifying the designated event. As shown in 701 of FIG. 7, upon detecting a movement of the electronic device 101, the electronic device 101 may change the read-out speed from the first frame rate, 30 fps or 60 fps, to a third frame rate of 120 fps, through the image sensor 230 and obtain a plurality of third images as per the third frame rate of 120 fps. The third frame rate may be higher than the first frame rate and be equal to or lower than a second frame rate. The electronic device 101 may identify a movement of an object in a region 710 of the plurality of third images. As shown in 702, the electronic device 101 may display the preview on the display 160 using at least one image of the plurality of third images and may identify a movement of an object (or a variation in pixel value in the ROI 710) using a designated region (e.g., the ROI 710) of the preview displayed. When the variation in pixel value in the designated region 710 of the displayed preview is not less than a threshold, the electronic device 101 may determine that an object movement is identified. The object movement may refer to various factors to vary the pixel value, such as, but not limited to, an object moving from outside the region 710 to the inside of the region 710, an object moving out of the region 710, or an object inside the region 710 reshaping. The electronic device 101 may identify whether there is a movement of the electronic device 101 within a designated time, and when no movement of the electronic device 101 is identified within the time, the electronic device 101 may identify a movement of an object in the designated region 710 of the preview. The electronic device 101 may identify a movement of the object in the designated region 710 of the preview using the camera 180 of which the focusing has been locked. The electronic device 101 may identify a movement of the object in the designated region 710 of the preview using the exposure adjustment-locked camera 180. In response to identifying a movement of the object in the designated region 710 of the preview, the electronic device 101 may lock the focusing to prevent defocusing on at least one object using the camera 180. In response to identifying a movement of the object in the designated region 710 of the preview, the electronic device 101 may lock the exposure adjustment to prevent the exposure from changing on at least one object using the camera 180.

At step 509, the electronic device 101 (e.g., at least one of the processor 120 or the controller 340) may obtain a plurality of second images at the second frame rate, which is higher than the first frame rate, using the focusing-locked camera 180 based at least in part on the designated event.

The electronic device 101 (e.g., at least one of the processor 120 or the controller 340) may obtain the plurality of second images as per the second frame rate using the focusing-locked camera 180 based on identifying a user input related to initiating slow motion recording. As shown in FIG. 6B, based on identifying the reception of the user input through the user interface 630, the electronic device 101 may obtain the plurality of second images at a frame rate of 960 fps using the focusing-locked camera 180. The electronic device 101 may obtain the plurality of second images as per the second frame rate using the exposure adjustment-locked camera 180 in response to identifying a user input related to initiating slow motion recording. Based at least in part on the designated event, the electronic device 101 may obtain the plurality of second images as per the second frame rate using a camera 180 which locks at least one of the focusing or the adjusting the exposure.

The electronic device 101 (e.g., at least one of the processor 120 or the controller 340) may obtain the plurality of second images as per the second frame rate using the focusing-locked camera 180 based on identifying a movement of an object in a designated region of at least one of the plurality of the first images. As shown in 702, based on identifying the movement of an object in the designated region 710 of at least one of the plurality of the first images, the electronic device 101 may obtain the plurality of second images at a frame rate of 960 fps using the focusing-locked camera 180. The electronic device 101 may obtain the plurality of second images as per the second frame rate using the exposure adjustment-locked camera 180 based on identifying the movement of an object in the designated region of the at least one of the plurality of the first images.

At step 511, the electronic device 101 (e.g., at least one of the processor 120 or the controller 340) may provide a video related to at least one object of the one or more objects using a second portion of the plurality of first images and at least one of the plurality of second images. The electronic device 101 may provide a video related to an object by merging at least one of the plurality of first images obtained at a frame rate of 30 fps or 60 fps and at least one of the plurality of second images obtained at a frame rate of 960 fps. The electronic device 101 may play the provided video through the display 160 as per a fourth frame rate. The fourth frame rate may be the same as or different from the first frame rate. The electronic device 101 may play the provided video at a frame rate of 30 fps or 60 fps through the display 160.

Figure 8:
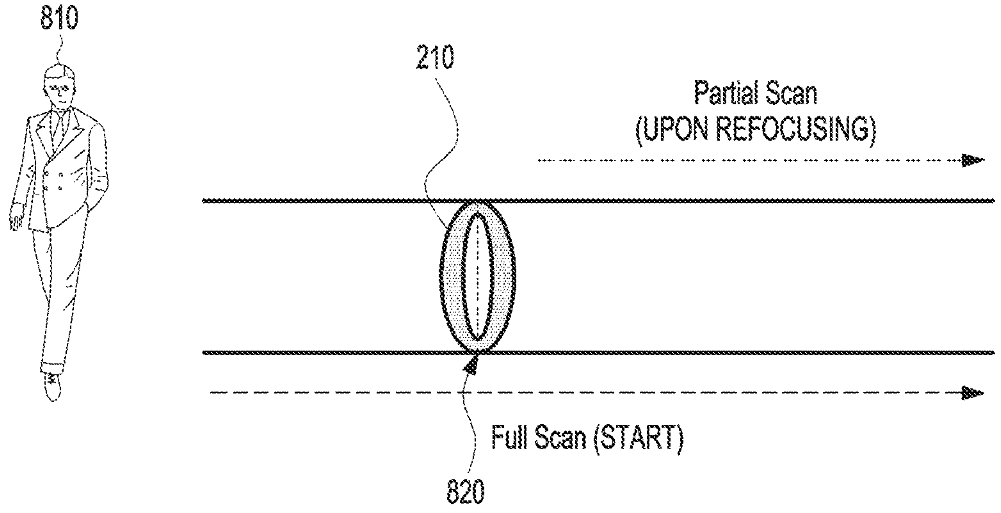
FIG. 8 is a diagram illustrating an example in which an electronic device resumes focusing after slow motion recording, according to an embodiment of the disclosure.
Figure 9:
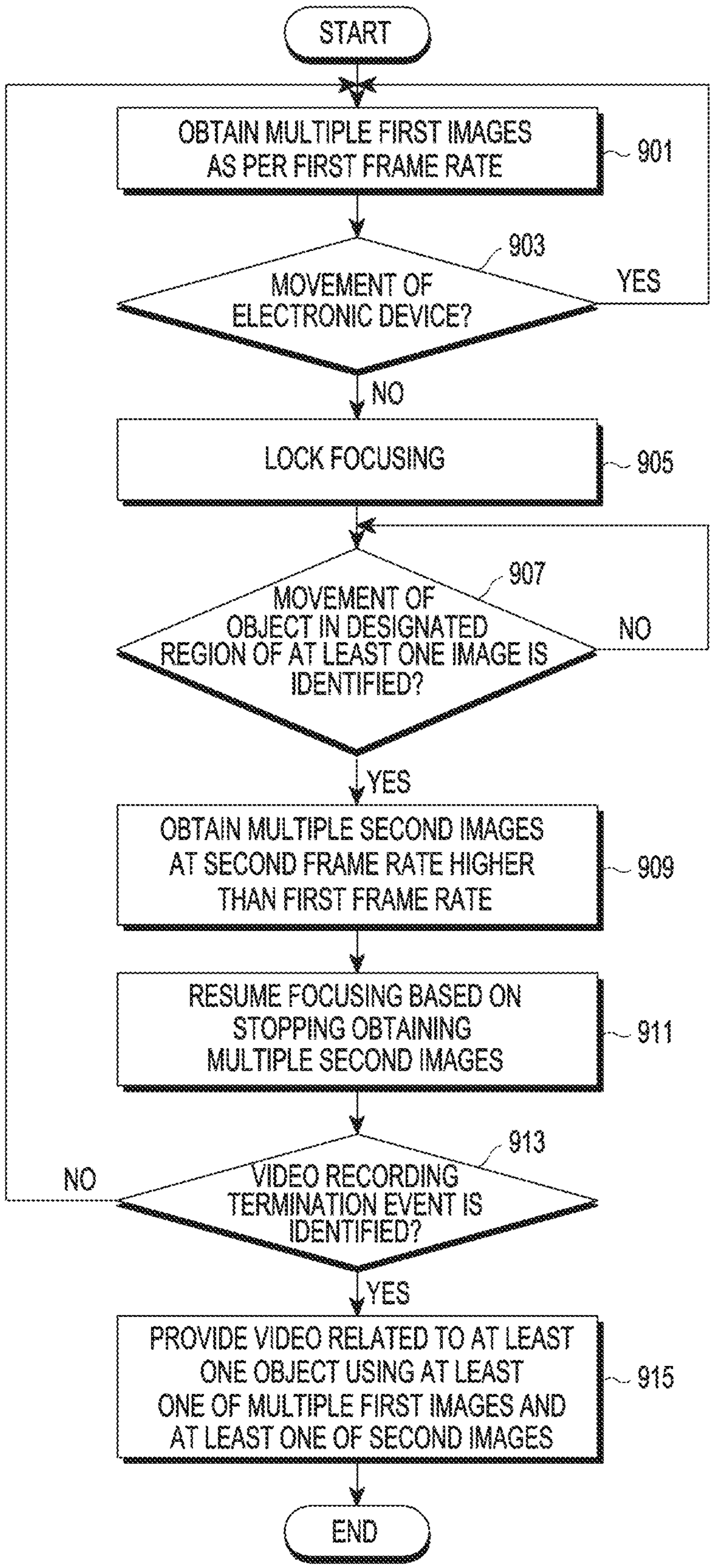
FIG. 9 is a flowchart of a method for capturing video on an electronic device in slow motion in response to identifying a movement of an object in a designated range of a preview, according to an embodiment of the disclosure.

FIG. 8 is a diagram illustrating an example in which an electronic device 101 resumes focusing after slow motion recording, according to an embodiment. FIG. 9 is a flowchart of a method for capturing video on an electronic device 101 in slow motion in response to identifying the movement of an object in a designated range of a preview, according to an embodiment. The embodiment of FIG. 9 is described in detail with reference to FIGS. 6B, 7, and 8.

At step 901, the electronic device 101 (e.g., at least one of the processor 230 or the controller 340 in the image sensor 230) may obtain a plurality of first images as per a first frame rate on one or more objects using a camera 180 based on a signal related to image recording. The electronic device 101 may obtain a plurality of first images as per a frame rate of 30 fps or 60 fps on objects using the camera 180 based on the image recording-related signal. The electronic device 101 may perform the focusing of a lens assembly 210 included in the camera 180 for at least one object from among one or more objects while obtaining the plurality of first images. The electronic device 101 may perform the focusing using the focusing step 501 of FIG. 5.

The electronic device 101 (e.g., at least one of the processor 120 or the controller 340) may store one or more images of the plurality of first images for background recording in the memory 130. When the electronic device 101 meets a designated condition for deleting at least one image from the memory, the electronic device 101 may delete at least one image of the one or more images of the plurality of first images stored in the memory 130. Based on a designated time being elapsed since the recording-related signal is provided, the electronic device 101 may identify that the designated condition is met, and based on the designated condition being met, sequentially delete at least one image of the one or more images of the plurality of first images stored in the order of the storage. Based on one or more images of the plurality of first images for background recording being stored in the memory 130 by a predetermined range or capacity since the recording-related signal is provided, the electronic device 101 may identify that the designated condition is met, and based on the designated condition being met, sequentially delete at least one image of the one or more images of the plurality of first images stored in the order of the storage.

At step 903, the electronic device 101 (e.g., at least one of the processor 120 or the controller 340) may identify whether there is movement of the electronic device 101. The electronic device 101 may identify whether there is movement of the electronic device 101 within a predetermined time using sensor module 176. As shown in 701 of FIG. 7, the electronic device 101 may identify sensor data through the sensor module 176 during the predetermined time, and when the sensor data is less than a threshold, the electronic device 101 may determine that there is no movement of the electronic device 101. The electronic device 101 may sense the movement of the electronic device 101 based on at least one of a gyro sensor or an acceleration sensor. As a sensor to detect the movement of the electronic device 101, the gyro sensor or the acceleration sensor is merely an example, but is not limited thereto.

At step 905, the electronic device 101 (e.g., at least one of the processor 120 or the controller 340) may lock the focusing of the lens assembly 210 included in the camera 180 on at least one object of one or more objects. The electronic device 101 may lock the focusing based on no movement of the electronic device 101.

At step 907, the electronic device 101 (e.g., at least one of the processor 120 or the controller 340) may identify the movement of an object in a designated region of at least one image as a preview. Based on no movement of the electronic device 101 being identified, the electronic device 101 may operate in slow motion recording standby mode. In the slow motion recording standby mode, the electronic device 101 may change the read-out speed of the image sensor 230 from the first frame rate corresponding to the plurality of first images to the third frame rate corresponding to the plurality of third images and object the plurality of third images as per the third frame rate. For example, in the slow motion recording standby mode, the electronic device 101 may change a read-out speed of 30 fps or 60 fps to a read-out speed of 120 fps and obtain a plurality of images at the read-out speed of 120 fps. The third frame rate may be higher than the first frame rate and be equal to or lower than the second frame rate.

Based on identifying no movement of the electronic device 101, the electronic device 101 (at least one of the processor 120 or the controller 340) may identify the movement of an object in the designated region 710 of at least one of the plurality of first images or in the designated region 710 of at least one of the plurality of third images. As shown in 702 of FIG. 7, based on identifying no movement of the electronic device 101, the electronic device 101 may identify whether there is movement of the object in the designated region 710. When the pixel variation in the designated region 710 of the plurality of images is larger than a threshold related to the movement of the object, the electronic device 101 may determine that there is movement of the object. The electronic device 101 may identify the movement of the object in the designated region 710 of the plurality of images using the focusing-locked camera. In response to identifying the movement of the object in the designated region 710 of the plurality of images, the electronic device 101 may lock the focusing on the object.

At step 909, the electronic device 101 (e.g., at least one of the processor 120 of FIG. 1 or the controller 340 of FIG. 3) may obtain a plurality of second images at the second frame rate, which is higher than the first frame rate, using the focusing-locked camera 180. As shown in 702 of FIG. 7, upon identifying the movement of an object in the designated region 710, the electronic device 101 may obtain the plurality of second images at a frame rate of 960 fps, which is higher than the frame rate of 30 fps or 60 fps, using the focusing-locked camera 180. While obtaining the plurality of second images, the electronic device 101 may read out the plurality of second images as per the second frame rate through the image sensor 230 and store the plurality of second images in the memory 130 as per the second frame rate.

The electronic device 101 (e.g., at least one of the processor 120 or the controller 340) may control the camera 180 to perform focusing based on the driving speed of the lens assembly 210 and the read-out speed of the image sensor 230. When the time for the focusing of the lens assembly 210 is equal to or shorter than the read-out time, the electronic device 101 may control the camera to perform the focusing of the lens assembly 210. When the time for the focusing of the lens assembly 210 is 1/960 seconds, and the read-out time of the image sensor 230 operating at a frame rate of 120 fps is 1/120 seconds, the electronic device 101 may perform focusing.

The electronic device 101 (e.g., at least one of the processor 120 or the controller 340) may control the camera to perform focusing based on the moving distance of the object for the read-out time of the image sensor 230. The electronic device 101 may identify the moving distance of the object along the optical axis through the sensor module 176 (e.g., an IR sensor). The electronic device 101 may identify the moving distance of the object based on at least one image frame obtained by performing the focusing. Based on the moving distance of the object along the optical axis with respect to the read-out time of the image sensor 230 being not less than the depth of focus, the electronic device 101 may control the camera 180 to perform focusing. Based on the read-out time of the image sensor 230 operating at a frame rate of 120 fps being 1/120 seconds, and the moving distance of the object along the optical axis during the time being not less than the depth of focus, the electronic device 101 may control the camera 180 to perform focusing.

At step 911, the electronic device 101 (e.g., at least one of the processor 120 or the controller 340) may control the camera 180 to resume the focusing of the lens assembly 210 based on stopping obtaining the plurality of second images. When a slow motion recording termination event occurs, the electronic device 101 may stop obtaining the plurality of second images. As the slow motion recording termination event, the electronic device 101 may determine that the slow motion recording termination event has occurred when a designated time elapses after the time of obtaining the plurality of second images. As the slow motion recording termination event, the electronic device 101 may determine that the slow motion recording termination event has occurred when the plurality of second images are stored in the memory 130 by a designated number of image frames or by a designated capacity. As the slow motion recording termination event, the electronic device 101 may determine that the slow motion recording termination event has occurred when user input is identified through a user interface related to the termination of the slow motion recording. When the slow motion recording termination event occurs, the electronic device 101 may control the camera 180 to resume the focusing using the focusing step 501 of FIG. 5.

The electronic device 101 (e.g., at least one of the processor 120 or the controller 340) may control the camera 180 to resume the focusing of the lens assembly 210 by moving the lens assembly 210 from a first position at the time of resuming the focusing to a second position away from where the at least one object is positioned. When the distance between the electronic device 101 and an object 810 increases as shown in FIG. 8, the electronic device 101 may control the camera 180 to resume the focusing of the lens assembly 210 by moving the position 820 of the lens assembly 210 at the time of resuming the focusing away from where the object 810 is positioned.

At step 913, the electronic device 101 (e.g., at least one of the processor 120 or the controller 340) may identify whether a video recording termination event has occurred. As shown in FIG. 7, upon identifying a user input related to the termination of video recording through the user interface 720, the electronic device 101 may identify that the video recording termination event has occurred.

Upon identifying no video recording termination event, the electronic device 101 (e.g., at least one of the processor 120 or the controller 340) may return to step 901, obtaining a plurality of first images for one or more objects as per the first frame rate. From the time of stopping obtaining the plurality of second images or the time of obtaining the plurality of first images, the electronic device 101 may perform part of background recording at step 901. From the time of stopping obtaining the plurality of second images or the time of obtaining the plurality of first images, the electronic device 101 may store at least one image of the plurality of first images in the memory 130, and when a designated condition is met at step 901, the electronic device 101 may delete at least some of the plurality of first images stored in the memory 130.

At step 915, the electronic device 101 (e.g., at least one of the processor 120 of FIG. 1 or the controller 340 of FIG. 3) may provide a video related to an object using at least one image of the plurality of first images and at least one image of the plurality of second images. The electronic device 101 may provide a video related to the objects by merging at least one image of the plurality of first images obtained at a frame rate of 30 fps or 60 fps and at least one image of the plurality of second images obtained at a frame rate of 960 fps. The electronic device 101 may store the video related to the objects in the memory 130.

Based on stopping obtaining the plurality of second images, the electronic device 101 may provide the video related to the objects using at least one image of the plurality of first images and at least one image of the plurality of second images. The electronic device 101 may play the provided video through the display 160 as per a fourth frame rate. The fourth frame rate may be the same as or different from the first frame rate. The electronic device 101 may play the provided video at a frame rate of 30 fps or 60 fps through the display 160.

Figure 10:
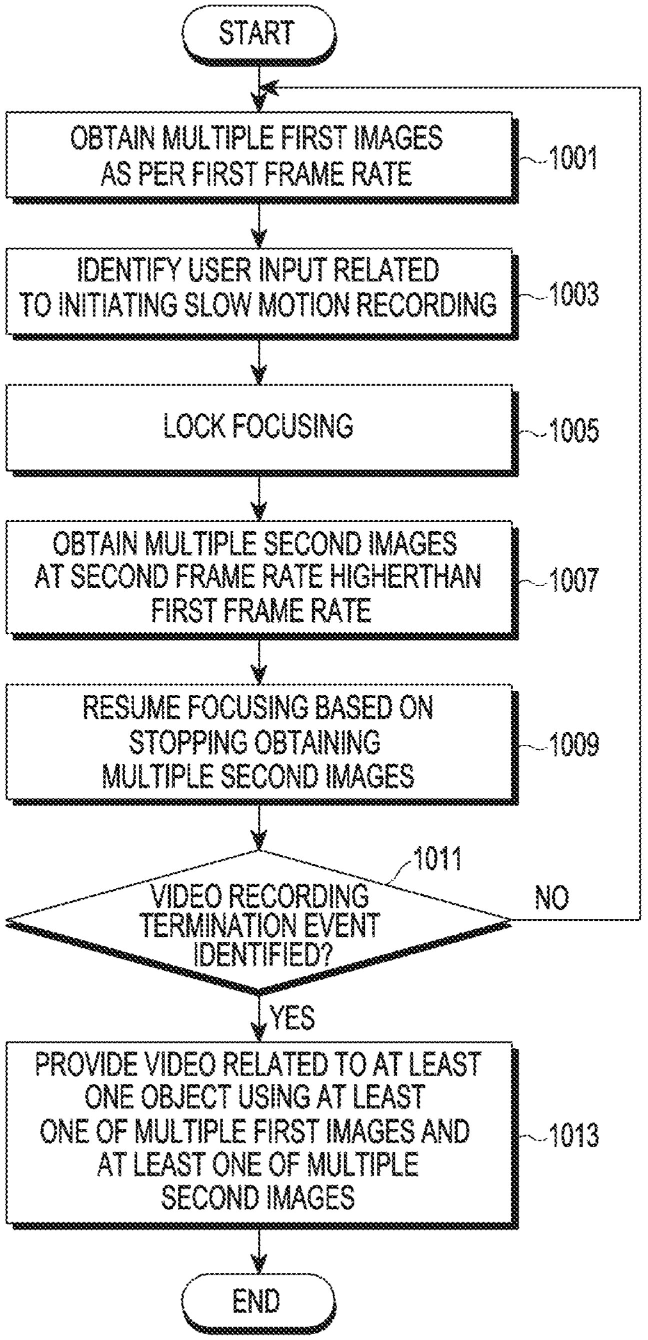
FIG. 10 is a flowchart of a method for capturing video on an electronic device in slow motion in response to identifying a user input related to initiating slow motion recording, according to an embodiment of the disclosure.

FIG. 10 is a flowchart of a method for capturing video on an electronic device 101 in slow motion in response to identifying a user input related to initiating slow motion recording, according to an embodiment.

At step 1001, the electronic device 101 (e.g., at least one of the processor 230 or the controller 340 in the image sensor 230) may obtain a plurality of first images as per a first frame rate on one or more objects using a camera 180 based on a signal related to image recording. The electronic device 101 may obtain a plurality of first images as per a frame rate of 30 fps or 60 fps on objects using the camera 180 based on the image recording-related signal. The electronic device 101 may perform the focusing of a lens assembly 210 included in the camera 180 on at least one object from among one or more objects while obtaining the plurality of first images. The electronic device 101 may control the camera 180 to perform the focusing using the focusing step 501 of FIG. 5.

The electronic device 101 (e.g., the processor 120) may store at least one image of the plurality of first images for background recording in the memory 130. The electronic device 101 may perform the background recording using the background recording step 901 of FIG. 9.

At step 1003, the electronic device 101 (e.g., the processor 120) may identify user input related to initiating slow motion recording. As shown in FIG. 6B, the electronic device 101 may display a user interface 630 related to initiating slow motion recording through the display 160 and identify the reception of the user input, which is related to initiating slow motion recording, through the user interface 630.

At step 1005, the electronic device 101 (e.g., at least one of the processor 120 or the controller 340) may control the camera 180 to lock the focusing of the lens assembly 210 included in the camera 180 on at least one object of one or more objects. Based on obtaining a user interface through the user interface 630 related to initiating slow motion recording, the electronic device 101 may control the camera 180 to lock the focusing to prevent a change of the focusing on at least one object using the camera 180.

At step 1007, the electronic device 101 (e.g., at least one of the processor 120 of FIG. 1 or the controller 340 of FIG. 3) may obtain a plurality of second images at the second frame rate, which is higher than the first frame rate, using the focusing-locked camera 180. As shown in FIG. 6B, based on a user input being received through the user interface 630 related to initiating slow motion recording, the electronic device 101 may obtain the plurality of second images at a frame rate of 960 fps, which is higher than the frame rate of 30 fps or 60 fps, using the focusing-locked camera 180. While obtaining the plurality of second images, the electronic device 101 may read out the plurality of second images as per the second frame rate through the image sensor 230 and store the plurality of second images in the memory 130 as per the second frame rate.

At step 1009, the electronic device 101 (e.g., at least one of the processor 120 or the controller 340) may control the camera 180 to resume the focusing of the lens assembly 210 based on stopping obtaining the plurality of second images. The electronic device 101 may control the camera 180 to resume the focusing using the step 911 of FIG. 9 of resuming focusing.

At step 1011, as shown in FIG. 7, based on identifying user input related to the termination of video recording through the user interface 720, the electronic device 101 (e.g., the processor 120) may identify that the video recording termination event has occurred.

Upon identifying no video recording termination event, the electronic device 101 may return to step 1001, obtaining a plurality of first images for one or more objects as per the first frame rate. From the time of stopping obtaining the plurality of second images or the time of obtaining the plurality of first images, the electronic device 101 may perform part of background recording at step 1001. From the time of stopping obtaining the plurality of second images or the time of obtaining the plurality of first images, the electronic device 101 may store at least one image of the plurality of first images in the memory 130, and when a designated condition is met at step 901, the electronic device 101 may delete one or more images of the plurality of first images stored in the memory 130.

At step 1013, the electronic device 101 may provide a video related to an object using at least one image of the plurality of first images and at least one image of the plurality of second images. The electronic device 101 may provide a video related to the objects by merging at least one image of the plurality of first images obtained at a frame rate of 30 fps or 60 fps and at least one image of the plurality of second images obtained at a frame rate of 960 fps. The electronic device 101 may store the video related to the objects in the memory 130. Based on stopping obtaining the plurality of second images, the electronic device 101 may provide the video related to the objects using at least one image of the plurality of first images and at least one image of the plurality of second images. The electronic device 101 may play the provided video through the display 160 as per a fourth frame rate. The fourth frame rate may be the same as or different from the first frame rate. The electronic device 101 may play the provided video at a frame rate of 30 fps or 60 fps through the display 160.

The electronic device may be one of various types of electronic devices. The electronic devices may include, for example, a portable communication device (e.g., a smart phone), a computer device, a portable multimedia device, a portable medical device, a camera, a wearable device, or a home appliance. The electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method may be provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, an electronic device includes a camera, a display, a memory, and at least one processor configured to obtain a plurality of first images for one or more objects as per a first frame rate using the camera based on a signal related to image recording and control the camera to perform focusing of a lens included in the camera on at least one of the one or more objects while obtaining the plurality of first images, provide a first portion of the plurality of first images as a preview through the display, control the camera to lock the focusing to prevent a change of the focusing on the at least one object, identify a designated event related to obtaining the plurality of first images, based at least in part on the designated event, obtain a plurality of second images as per a second frame rate higher than the first frame rate using the focusing-locked camera, and provide a video related to the at least one object using a second portion of the plurality of first images and at least one of the plurality of second images.

The at least one processor may be configured to focus on the at least one object included in a designated region within the plurality of first images.

The at least one processor may be configured to control the camera to perform the focusing of the lens using contrast auto-focusing The at least one processor may be configured to control the camera to perform the focusing of the lens on the at least one object corresponding to a region where a user's touch input is obtained or control the camera to perform the focusing of the lens based on a user input to select a degree of focus.

The at least one processor may be configured to obtain a plurality of third images as per a third frame rate through an image sensor included in the camera based on a movement of the electronic device as part of identifying the designated event, identify a movement of an object in a designated region of at least one of the plurality of third images, and based on identifying the movement of the object in the designated region of the at least one of the plurality of third images, obtain the plurality of second images as per the second frame rate using the camera.

The at least one processor may be configured to obtain the plurality of third images as per the third frame rate higher than the first frame rate.

The at least one processor may be configured to control the camera to perform adjusting exposure of the camera on the at least one object while locking the focusing, control the camera to lock the adjusting the exposure to prevent a change of the exposure on the at least one object while locking the focusing, and based at least in part on the designated event, obtain the plurality of second images as per the second frame rate higher than the first frame rate using the exposure adjustment-locked camera.

The at least one processor may be configured to, based on stopping obtaining the plurality of second images, control the camera to resume the focusing of the lens.

The at least one processor may be configured to store a third portion of the plurality of first images for background recording in the memory, and based on a designated condition being met, delete at least one image of the third portion of the plurality of first images stored in the memory from the memory.

The at least one processor may be configured to, based on a designated time being elapsed since the recording-related signal is provided, identify that the designated condition is met, and based on the designated condition being met, delete the at least one image of the third portion of the plurality of first images from the memory, or based on the third portion of the plurality of first images for background recording being stored in the memory by a predetermined range or a predetermined capacity since the recording-related signal is provided, identify that the designated condition is met, and based on the designated condition being met, delete the at least one image of the third portion of the plurality of first images from the memory.

According to an embodiment, a method for operating an electronic device configured to record an image includes obtaining a plurality of first images for one or more objects as per a first frame rate using a camera based on a signal related to image recording and controlling the camera to perform focusing of a lens included in the camera on at least one of the one or more objects while obtaining the plurality of first images, providing a first portion of the plurality of first images as a preview through a display, controlling the camera to lock the focusing to prevent a change of the focusing on the at least one object, identifying a designated event related to obtaining the plurality of first images, based at least in part on the designated event, obtaining a plurality of second images as per a second frame rate higher than the first frame rate using the focusing-locked camera, and providing a video related to the at least one object using a second portion of the plurality of first images and at least one of the plurality of second images.

Controlling the camera to perform the focusing of the lens may include focusing on the at least one object included in a designated region within the plurality of first images.

Controlling the camera to perform the focusing of the lens may include performing the focusing of the lens using contrast auto-focusing.

Controlling the camera to perform the focusing of the lens may include controlling the camera to perform the focusing of the lens on the one object corresponding to a region where a user's touch input is obtained or controlling the camera to perform the focusing of the lens based on a user input to select a degree of focus.

Identifying the designated event may include obtaining a plurality of third images as per a third frame rate through an image sensor included in the camera based on a movement of the electronic device, and identifying a movement of an object in a designated region of at least one of the plurality of third images. Obtaining the plurality of second images may include, based on identifying the movement of the object in the designated region of the at least one of the plurality of third images, obtaining the plurality of second images as per the second frame rate using the camera.

Obtaining the plurality of third images may include obtaining the plurality of third images as per the third frame rate higher than the first frame rate.

The method may further include controlling the camera to perform adjusting exposure of the camera on the at least one object while locking the focusing, control the camera to lock the adjusting the exposure to prevent a change of the exposure on the at least one object while locking the focusing, and based at least in part on the designated event, obtaining the plurality of second images as per the second frame rate higher than the first frame rate using the exposure adjustment-locked camera.

The method may further include, based on stopping obtaining the plurality of second images, controlling the camera to resume the focusing of the lens.

The method may further include storing a third portion of the plurality of first images for background recording in a memory, and based on a designated condition being met, deleting at least one of the third portion of the plurality of first images stored in the memory from the memory. Deleting from the memory may include, based on a designated time being elapsed since the recording-related signal is provided, identifying that the designated condition is met, and based on the designated condition being met, deleting the at least one image of the third portion of the plurality of first images from the memory, or based on the third portion of the plurality of first images for background recording being stored in the memory by a predetermined range or a predetermined capacity since the recording-related signal is provided, identifying that the designated condition is met, and based on the designated condition being met, deleting the at least one image of the third portion of the plurality of first images from the memory.

According to an embodiment, there is provided a non-transitory computer readable recording medium storing instructions for executing an operation of an electronic device including a camera, a display, a memory, and at least one processor, the operation including obtaining a plurality of first images for one or more objects as per a first frame rate using a camera based on a signal related to image recording and controlling the camera to perform focusing of a lens included in the camera on at least one of the one or more objects while obtaining the plurality of first images, providing a first portion of the plurality of first images as a preview through a display, controlling the camera to lock the focusing to prevent a change of the focusing on the at least one object, identifying a designated event related to obtaining the plurality of first images, based at least in part on the designated event, obtaining a plurality of second images as per a second frame rate higher than the first frame rate using the focusing-locked camera, and providing a video related to the at least one object using a second portion of the plurality of first images and at least one of the plurality of second images.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, an electronic device may lock focusing before initiating super slow motion video recording and record super slow motion video using the focusing-locked camera, obtaining a super slow motion video with the user's desired focus quality. According to various embodiments, an electronic device may provide a focusing method appropriate for super slow motion video recording.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An electronic device, comprising:
- a camera;
- a display;
- at least one processor; and
- memory storing instructions that, when executed by the at least one processor, cause the electronic device to:
  - control the camera to obtain a plurality of first images at a first frame rate based on a signal related to image recording,
  - provide the plurality of first images as a preview through the display,
  - control the camera to lock focusing corresponding to a designated region in the preview,
  - identify movement of an object in the designated region of which the focusing has been locked, and
  - based on identifying the movement of the object, control the camera to obtain, with the focusing locked, a plurality of second images at a second frame rate higher than the first frame rate.

2. The electronic device of claim 1, wherein the designated region is identified by a user touch input on the display.

3. The electronic device of claim 1, wherein the instructions, when executed by the at least one processor, further cause the electronic device to provide a video including the plurality of first images obtained at the first frame rate and the plurality of second images obtained at the second frame rate.

4. The electronic device of claim 1, wherein the instructions, when executed by the at least one processor, further cause the electronic device to focus on the object included in the designated region within the plurality of first images.

5. The electronic device of claim 1, wherein the instructions, when executed by the at least one processor, further cause the electronic device to control the camera to perform the focusing using contrast auto-focusing.

6. The electronic device of claim 1, wherein the instructions, when executed by the at least one processor, further cause the electronic device to control the camera to perform the focusing based on a user input to select a degree of the focusing.

7. The electronic device of claim 1, wherein the instructions, when executed by the at least one processor, further cause the electronic device to:
- control the camera to obtain a plurality of third images at a third frame rate through an image sensor included in the camera based on no movement of the electronic device,
- identify the movement of the object in the designated region of at least one of the plurality of third images, and
- based on identifying the movement of the object in the designated region of the at least one of the plurality of third images, control the camera to obtain the plurality of second images at the second frame rate.

8. The electronic device of claim 7, wherein the third frame rate is higher than the first frame rate.

9. The electronic device of claim 1, wherein the instructions, when executed by the at least one processor, further cause the electronic device to:
- control the camera to adjust exposure of the camera on the object while locking the focusing,
- control the camera to lock the adjusted exposure to prevent a change of the exposure on the object while locking the focusing, and
- based at least in part on the identified movement, control the camera to obtain the plurality of second images at the second frame rate using the locked-adjusted exposure.

10. The electronic device of claim 1, wherein the instructions, when executed by the at least one processor, further cause the electronic device to control the camera to unlock the focusing, in response to stopping the obtaining of the plurality of second images.

11. The electronic device of claim 1, wherein the instructions, when executed by the at least one processor, further cause the electronic device to:

store a portion of the plurality of first images for background recording in the memory, and based on a designated condition being met, delete at least one image of the portion of the plurality of first images from the memory.

12. The electronic device of claim 11, wherein the instructions, when executed by the at least one processor, further cause the electronic device to:

based on a designated time elapsing after the signal related to the image recording is provided, identify that the designated condition is met, and based on the designated condition being met, delete the at least one image of the portion of the plurality of first images from the memory; or based on the portion of the plurality of first images for background recording being stored in the memory by a predetermined range or a predetermined capacity since the signal related to the image recording is provided, identify that the designated condition is met, and based on the designated condition being met, delete the at least one image of the portion of the plurality of first images from the memory.

13. A method performed by an electronic device including a camera and a display, the method comprising:

controlling the camera to obtain a plurality of first images at a first frame rate based on a signal related to image recording;

providing the plurality of first images as a preview through the display;

controlling the camera to lock focusing corresponding to a designated region in the preview;

identifying movement of an object in the designated region of which the focusing has been locked; and based on identifying the movement of the object, controlling the camera, with the focusing locked, to obtain a plurality of second images at a second frame rate higher than the first frame rate.

14. The method of claim 13, further comprising:

receiving a user touch input on the display; and identifying the designated region based on the user touch input.

15. The method of claim 13, further comprising providing a video including the plurality of first images obtained at the first frame rate and the plurality of second images obtained at the second frame rate.

16. The method of claim 13, wherein controlling the camera to lock the focusing comprises focusing on the object included in the designated region within the plurality of first images.

17. The method of claim 13, wherein the focusing includes contrast auto-focusing or is based on a user input selecting a degree of the focusing.

18. The method of claim 13, wherein identifying the movement comprises:

controlling the camera to obtain a plurality of third images at a third frame rate higher than the first frame rate through an image sensor included in the camera based on no movement of the electronic device; and identifying the movement of the object in the designated region of at least one of the plurality of third images, and wherein obtaining the plurality of second images includes, based on identifying the movement of the object in the designated region of the at least one of the plurality of third images, controlling the camera to obtain the plurality of second images at the second frame rate.

19. The method of claim 13, further comprising:

controlling the camera to adjust exposure of the camera on the object while locking the focusing;

controlling the camera to lock the adjusted exposure to prevent a change of the exposure on the object while locking the focusing; and based at least in part on the identified movement, controlling the camera to obtain the plurality of second images at the second frame rate using the locked-adjusted exposure.

20. A non-transitory computer readable recording medium storing instructions for executing operations of an electronic device including a camera, a display, a memory, and at least one processor, the operations comprising:

controlling the camera to obtain a plurality of first images at a first frame rate based on a signal related to image recording;

providing the plurality of first images as a preview through the display;

controlling the camera to lock focusing corresponding to a designated region in the preview;

identifying movement of an object in the designated region of which the focusing has been locked; and based on identifying the movement, controlling the camera, with the focusing locked, to obtain a plurality of second images at a second frame rate higher than the first frame rate.

* * * * *